United States Patent
Summers, III

(10) Patent No.: US 12,545,611 B2
(45) Date of Patent: Feb. 10, 2026

(54) SLUDGE PROCESSING AND TREATMENT METHODS

(71) Applicant: B.A.M. 2 WASTE WATER CONSULTING, PTR., Gleason, TN (US)

(72) Inventor: Buford Harold Denton Summers, III, Gleason, TN (US)

(*) Notice: Subject to any disclaimer, the term of this patent is extended or adjusted under 35 U.S.C. 154(b) by 0 days.

(21) Appl. No.: 18/907,525

(22) Filed: Oct. 5, 2024

(65) Prior Publication Data

US 2025/0333345 A1  Oct. 30, 2025

Related U.S. Application Data

(60) Provisional application No. 63/638,222, filed on Apr. 24, 2024.

(51) Int. Cl.
*C02F 11/06* (2006.01)
*C02F 1/34* (2023.01)
*C02F 11/02* (2006.01)

(52) U.S. Cl.
CPC ............ *C02F 11/06* (2013.01); *C02F 11/02* (2013.01); *C02F 1/34* (2013.01); *C02F 2303/185* (2013.01); *C02F 2303/26* (2013.01)

(58) Field of Classification Search
CPC .. C02F 11/06; C02F 11/02; C02F 1/34; C02F 2303/185; C02F 2303/26; C02F 3/34; C02F 3/348; C02F 3/347; C02F 3/346; C02F 3/345; C02F 3/343; C02F 3/342; C02F 3/341; C02F 3/30; C02F 3/28; C02F 3/12; C02F 3/02; C02F 3/301; C02F 9/00; C02F 2001/007; C02F 11/00; C02F 11/002; C02F 11/004; C02F 11/006; C02F 11/008; C02F 11/04; C02F 11/10; C02F 11/12; C02F 11/121; C02F 11/14; C02F 11/16; C02F 11/148; C02F 11/147; C02F 11/143; C02F 11/128; C02F 11/127; C02F 11/126; C02F 11/125; C02F 11/123; C02F 11/122; C02F 2303/06; C02F 1/725; C02F 1/72; C02F 1/722; C02F 1/727; C02F 1/74; C02F 1/76; C02F 1/78; C02F 2305/02;
(Continued)

(56) References Cited

U.S. PATENT DOCUMENTS 7,384,573 B2    6/2008  Brummett
9,630,888 B1 *  4/2017  Lattimore, Jr. ........... C05F 3/04
(Continued)

OTHER PUBLICATIONS http://www.rainfineirrigation.com/4-smart-irrigation-system/195059/ (Year: 2015).*
(Continued)

*Primary Examiner* — Benjamin L Lebron
*Assistant Examiner* — Bernadette Karen McGann
(74) *Attorney, Agent, or Firm* — FBT Gibbons LLC

(57) ABSTRACT

Methods of treating sludge to remove solid waste are disclosed. The methods can include one or more of agitation, atomization, chemical treatment, and biological treatment. Particularly advantageous methods of treating sludge can be achieved with agitation and atomization alone. Articles and devices for treating the sludge are further disclosed. The methods of treating sludge can be used for agricultural, industrial, or municipal sludge.

17 Claims, 10 Drawing Sheets
(9 of 10 Drawing Sheet(s) Filed in Color)

(58) Field of Classification Search
CPC .......... C02F 2305/00; C02F 2305/026; C02F 2305/023; C02F 1/008; C02F 1/40; C02F 1/36; C02F 2201/00; C02F 2201/002; C02F 2203/006; C02F 2203/00; C12N 1/20; C12N 1/205; C12N 1/12; C12N 7/00; C12N 1/02; C12N 1/04
USPC ..... 435/252.1; 210/609, 623, 258, 219, 631, 210/620, 630, 601; 417/423.3, 36, 417/423.14, 390, 900; 422/292, 261, 255
See application file for complete search history.

(56) References Cited

U.S. PATENT DOCUMENTS

| | | | |
|---|---|---|---|
| 10,246,380 B2* | 4/2019 | Summers, III | A61L 2/18 |
| 2008/0105604 A1* | 5/2008 | Weis | B01D 21/2411 |
| | | | 210/170.08 |
| 2010/0147764 A1* | 6/2010 | Hassan | C02F 1/76 |
| | | | 210/627 |
| 2014/0263039 A1* | 9/2014 | Horst | C02F 3/28 |
| | | | 210/601 |
| 2015/0092511 A1* | 4/2015 | Taylor | C02F 11/00 |
| | | | 366/136 |

OTHER PUBLICATIONS https://farmerboyag.com/stenner-pump-classic-45-series-fixed-single-head-electromechanical-pump-0-13-gph-120-vac-26-rpm-motor/ (Year: 2023).*

The Venturi Effect: Discovered by Giovanni Battista Venturi, Tyler Daniel (2022) https://web.archive.org/web/20220131183644/https://blog.exair.com/2022/01/31/the-venturi-effect-discovered-by-giovanni-battista-venturi/ (Year: 2022).*

* cited by examiner

SLUDGE PROCESSING AND TREATMENT METHODS

CROSS-REFERENCE TO RELATED APPLICATIONS

The present applications claims the priority benefit of U.S. Provisional Patent Application Ser. No. 63/638,222, filed Apr. 24, 2024, which is hereby incorporated by reference herein in its entirety.

TECHNICAL FIELD

The present disclosure relates generally to sludge processing and treatment methods that degrade solid waste in sludge to produce free-flowing water.

BACKGROUND

Industrial, municipal, and agricultural waste may form various sludges containing solid waste. Industrial sources of solid waste include beer brewing and animal waste processing (e.g., beef and poultry) processes, which generates large amounts of wastewater effluent and solid wastes (e.g., spent grains, trub, spent yeast, diatomaceous earth, etc.). Municipal sources of solid waste may include human waste, household waste, and run-off from streets. Agricultural sources of solid waste include manure generated on farms, in feedlots, in dairies, confined animal feeding operations ("CAFO"), etc. Regardless of the source of solid waste, the sludge must be treated and/or disposed of in accordance with regulations set by governmental entities to separate the solid waste from the water.

SUMMARY

According to one embodiment, a sludge treatment method includes one or more of the steps of a) degrading the sludge using high shear processing; b) adding a chemical oxidant to chemically oxidize the slurry; and c) adding aerobic bacteria, facultative bacteria and combinations thereof to biologically degrade the slurry.

According to another embodiment, a shear-inducing structure for degrading sludge includes a fluid opening, a fluid output, and a shear-inducing plate located between the fluid opening and the fluid output. The shear-inducing plate includes an opening to reduce the area of the fluid opening to the area of the fluid output.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

While the specification concludes with claims which particularly point out and distinctly claim the invention, it is believed the present invention will be better understood from the following description of certain examples taken in conjunction with the accompanying drawing and photos, in which like reference numerals identify the same elements and in which:

Figure 1A:
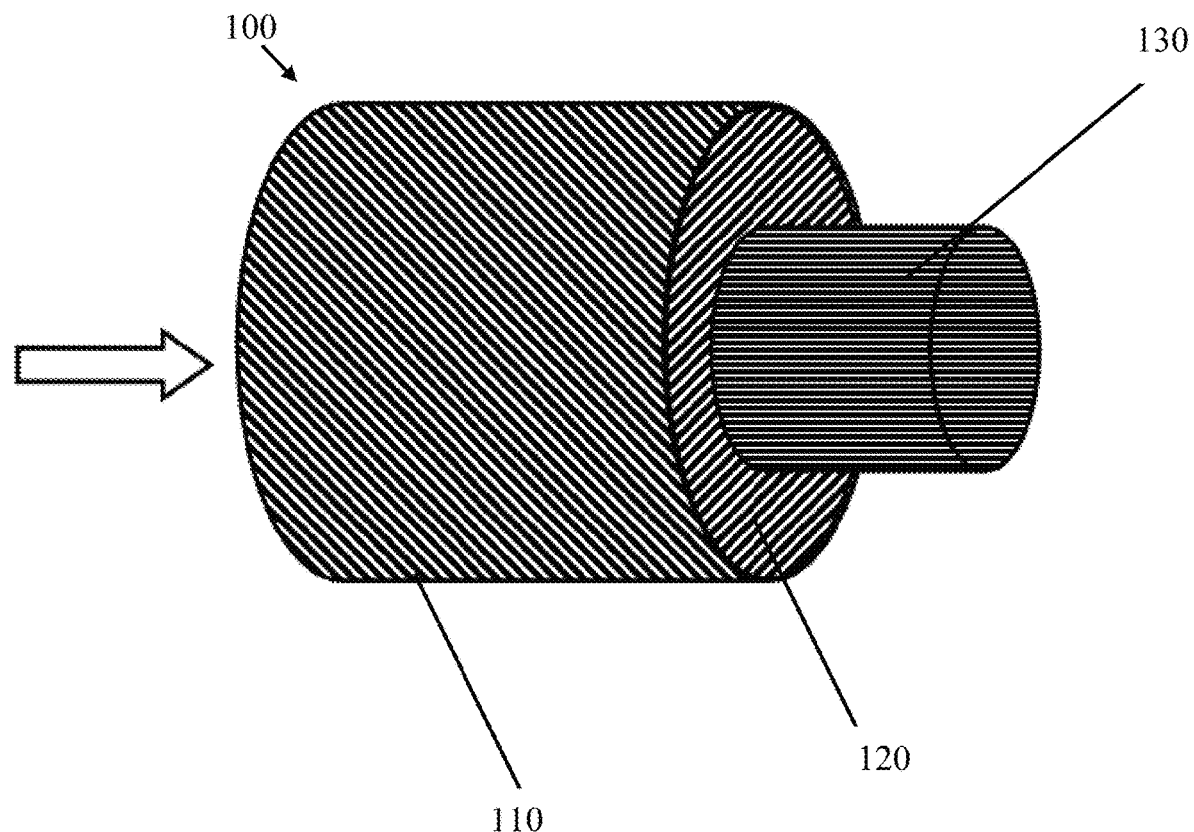
FIGS. 1A and 1B depict a perspective and front views of a shear-inducing structure.

The drawings and photos are not intended to be limiting in any way, and it is contemplated that various embodiments of the method may be carried out in a variety of other ways, including those not necessarily depicted in the drawing. The accompanying drawings are incorporated in, and forms a part of, the specification, and illustrates several aspects of the present method, and together with the description serve to explain the principles of the method; it being understood, however, that this method is not limited to the precise arrangements shown.

DETAILED DESCRIPTION

Definitions

"Biodegraded" as used herein means solid waste and/or or components of solid waste, that have been at least partially or totally broken down to a molecular level through consumption by microorganisms, e.g., bacteria. "Biodegradation" as used herein refers to the process of at least partially or totally breaking solid waste and/or components of solid waste down to a molecular level.

"Biological receptacle" as used herein means any receptacle that will sufficiently contain solid waste before, after or during, treatment of the solid waste with biological agents, e.g., microbes, enzymes, etc. Non-limiting examples of biological receptacles include: chambers, lagoons, tanks, retention ponds and the like.

"Chlorination receptacle" as used herein means any receptacle that will sufficiently contain solid waste before, after or during, chlorination of the solid waste. Non-limiting examples of chlorination receptacles include: chambers, lagoons, tanks, retention ponds and the like.

"Dechlorination receptacle" as used herein means any receptacle that will sufficiently contain solid waste before, after or during, 3ichlorination of the solid waste. Non-limiting examples of 4ichlorination receptacles include: chambers, lagoons, tanks, retention ponds and the like.

"Degraded" as used herein means solid waste that has been at least partially or totally been disintegrated into smaller components. "Degradation" as used herein refers to the process of at least partially breaking solid waste down into smaller components.

"Holding receptacle" as used herein means any receptacle that will sufficiently contain solid waste before, after or during, a solid waste treatment step. Non-limiting examples of holding receptacles include: chambers, lagoons, tanks, retention ponds and the like.

"Slurry" as used herein means a suspension of solid waste in a liquid, e.g., water.

"Sludge" as used herein means a solid to liquid wastewater product including municipal sludge, sludge excreted by an animal or human, sludge from industrial processes, sludge from agricultural processes and combinations thereof. Sludge includes both solid waste and some liquid, e.g., water.

"Sterilization" as used herein means a process that destroys and/or inactivates microbes by chemical and/or physical means. "Sterilization" as used herein encompasses partial sterilization or total sterilization.

"Sterilized" as used herein describes destroyed and/or inactivated microbes. "Sterilized" as used herein encompasses the terms "partially sterilized" or "totally sterilized."

Description

As will be described herein, methods of processing and treating sludge to remove and/or degrade solid waste in the sludge are disclosed to produce free flowing water. The solid waste can be degraded from the sludge through one or more process treatments including pre-treatment and agitation processes; high-shear processes; chemical oxidation processes; and biological treatment processes.

As can be appreciated, each of the one or more process treatments modifies the sludge in particular ways. Specifically:

a. Pre-treatment and agitation processes can be used to break up and solubilize solid waste contained in the sludge to make a flowable slurry amenable to further processing. Pre-treatment processes include agitation and the addition of further amounts of water.

b. High-shear processes use mechanical shear to atomize sludge. High-shear processes physically and chemically degrade solid waste contained within the sludge.

c. Chemical oxidation processes utilize a reactive oxidant to further degrade and sterilize solid waste in sludge.

d. Biological processes use bacteria strains to degrade and neutralize solid waste in the sludge.

The number and selection of the one or more processes can vary depending on the source and type of the sludge as well as the intended use for the treated sludge. For example, treatment of a free-flowing sludge with solubilized solid waste (e.g., a slurry) may omit pre-treatment and agitation processes and start with a high-shear process to degrade the sludge. Conversely, processing of sludge intended for non-human-adjacent irrigation may not need to be processed with chemical oxidation or biological treatment processes and can, for example, include only pre-treatment and agitation processes followed by high-shear processes. As will therefore be appreciated, the processes and treatments described herein can be widely varied depending on the specific circumstances and each of the processes can be modified as needed.

As will be appreciated, the one or more described processes of pre-treatment and agitation; high-shear; chemical oxidation; and biological treatment are not necessarily the exclusive steps used to process and treat sludge. For example, other optional process steps such as mechanical filtering, flocculation, oxygenation, and neutralization steps can be performed as known in the art if necessary or for specific purposes. Instead, the described processes enable improved processing of sludge by increasing the speed and efficiency of the sludge treatment process. In certain embodiments however, the described processes alone can be sufficient to fully process and treat sludge resulting in significant time and cost savings over known methods.

Additionally, while described separately, the one or more processes can also be combined into single steps in certain embodiments. For example, high-shear processes can occur simultaneously with the addition of a chemical oxidant. And agitation processes can be useful in every stage of processing sludge as it continually ensures mixing of all of the components of the sludge. Biological processes and chemical oxidation processes cannot be combined however.

In certain embodiments, each of the steps described herein can be performed in the same container (e.g., a lagoon or a waste water processing tank). However, in other embodiments, certain steps can be performed in separate containers. Separate containers can be useful for permanent installations such as water treatment facilities while processing the sludge in a single container can be useful if the sludge is contained in, for example, a lagoon.

Pre-Treatment and Agitation Processes

As can be appreciated, it can sometimes be necessary to use a pre-treatment process on sludge containing high amounts of solid waste to transform the sludge from a solid, or near-solid, state, to a processable slurry. Pre-treatment processes can solubilize the solid waste to make the sludge a flowable slurry. Pre-treatment processes can also agitate settled out solid waste located at the bottom of a reservoir or other container.

Generally, pre-treatment processes can include any steps that make a sludge flowable and disperses solid waste into the sludge. For example, pre-treatment steps can include the addition of water and agitation processes. The addition of water can decrease the concentration of solid waste while agitation can solubilize or disperse the solid waste in the sludge.

Agitation is a useful process step to fluidize sludge that contains very large concentrations of solid waste. Agitation processes use high-volume pumps or impellers to agitate, or stir, sludge to form a flowable slurry. Prior to agitation, solid waste can prevent flowability of the sludge impending further process. For example, solid waste can be dried, condensed, or can be present in such bulk, as to prevent flowability of the sludge. After agitation is complete, the sludge can be in the form of a slurry with the solid waste suspended in the aqueous solution. In the absence of any further treatment, solid waste suspended in the sludge may begin to settle out due to density differences necessitating the need for further treatment.

In certain embodiments, pre-treatment and agitation processes can be performed as the first step of a water treatment process as it can facilitate further processing which would otherwise be impossible due to the non-flowing viscosity of the sludge. As can be appreciated however, pre-treatment and agitation processes can be unnecessary if the sludge to be processed is already in a free-flowing state due to, for example, low concentrations of solid waste, or existing flow which already agitates the sludge. In embodiments where pre-treatment and agitation is performed, pre-treatment processes can be performed until the sludge reaches a free-flowing state that has solubilized all of the solid waste.

Generally, any type of agitation process can be suitable including the use of high-velocity pumps, water mixing units, impeller aerators, venturi pumps, vertical aerators, or the use of a floating pump system. In certain embodiments, it can be particularly advantageous to use a floating pump system as such systems can facilitate agitation of solids from the bottom and middle of a sludge source that can be more difficult to reach using a non-floating pump. An example of a particularly useful floating pump system is the Lagoon Crawler system manufactured by Nuhn Industries (Sebringville, Ontario Canada).

High-Shear Processes

It has presently been discovered that solid waste can advantageously be degraded using high shear process that atomize the sludge. Without being bound by theory, is it believed that the high shear processes described herein physically destroy a portion of the solid waste through the intense shear forces causing atomization of the sludge. Specifically, it is believed that the shear forces can cause physical and chemical degradation of the solid waste particles leading to the formation of various peroxides, hydrogen gas, oxygen gas, and atomized particles of solid waste.

For instance, high-shear processing can degrade biological components and can cause cellular lysis, break open the cellular membrane, and release water and intracellular components. Additionally, high-shear processes can break apart extra cellular polymeric substances ("EPS") which are complex, high-molecular weight, mixtures of polymers excreted by microorganisms and produced from cell lysis and adsorbed organic matter from wastewater. Extra cellular polymeric substances are a major component in microbial aggregates.

Sludge treated with the high shear force process described herein can cause a reduction of about 25%, about 35% about 45%, about 50%, about 65%, or greater than 70% of the mass and/or volume of the solid waste contained in the sludge.

The high shear process can lead to the formation of films and foams on the surface of the sludge and brightening of the color of the sludge believed to be caused by the formation of degraded compounds. Recent journal articles have found that atomization processes that produce micro droplets via, for example, pneumatic spraying, can form hydrogen peroxide and physically and chemically tear apart compounds. Peroxide compounds in excess of 100 parts per million have been detected in sludge treated with high shear processes.

The high shear processes described herein can use high velocity pumps and a shear-inducing structure to atomize and degrade sludge. In certain embodiments, the shear-inducing structure can be at the output of a high velocity sludge line, such as the output line of a lagoon crawler (e.g., a Nuhn-crawler). In certain embodiments, the same pump system used in the pre-treatment processes can be modified to produce high shear by, for example, attaching the shear-inducing structure to the output of the pump system.

The shear inducing structure can be a structure that has a fluid opening, a fluid output, and a flow interruption structure between the fluid opening and the fluid output. In certain embodiments, the fluid opening can be a pipe, or a portion thereof, having a first fluid opening while the flow interruption structure and the fluid output can be a plate (e.g., a metal plate) or other obstruction having a cutout smaller in diameter, or size, than the fluid opening. In certain embodiments, the shear inducing structure can be located at the discharge line of a pipe while in other embodiments, the shear inducing structure can be located in the middle of a pipe line. As can be appreciated, the flow interruption structure and the fluid output can be the same structure.

In certain embodiments, the fluid opening and the fluid output of the shear-inducing structure can be circular, or substantially circular openings. In such embodiments, the ratio between the diameter of the fluid opening and the fluid output can vary. For example, in certain embodiments, the ratio of the diameter of the fluid opening to the diameter of the fluid output can be a ratio of about 1 to about 0.5 as this has been discovered in testing to provide significant atomization and degradation of solid waste without overloading the pump. For example, in testing, a 6" pipe line connected to a shear inducing structure having a 3" fluid output has been found to be particularly effective at atomizing and degrading sludge when used with a pump exceeding 1,200 gallons-per-minute. In some embodiments, the pump can exceed 2,000 gallons-per-minute. Similar results have been found using pumps having smaller flow rates. For example, a 5 gallon per minute pump still exhibited optimal results when the fluid opening and the shear inducing structure had a size ratio of about 1 to about 0.5.

As can be appreciated however, other ratios can also be effective. Generally, the ratio of the fluid opening to the fluid output can vary from a ratio of about 1 to about 0.80 to a ratio of about 1 to about 0.10 in various embodiments. As can be appreciated, the ratio can vary depending on factors such as the strength of the pump/motor and the desired degree of atomization. Larger ratios can require stronger motors to overcome the back pressure created on the pump by the shear inducing structure.

Figure 1B:
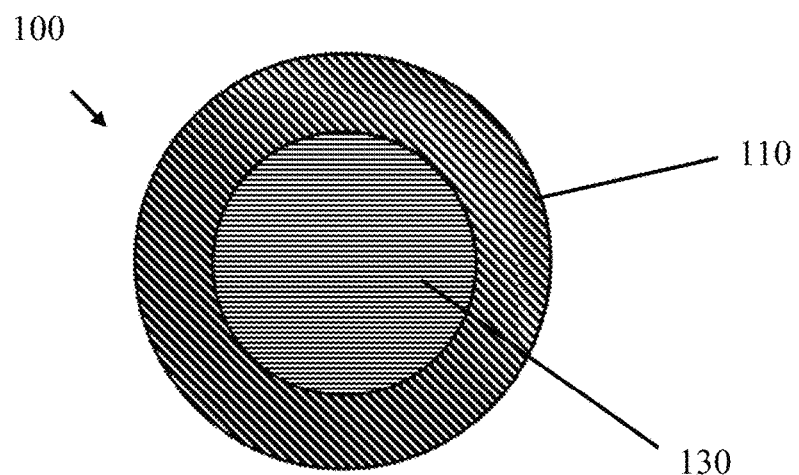

An exemplary shear-inducing structure 100 made with a circular cross-section is depicted in FIGS. 1A and 1B. As depicted, incoming sludge enters a first pipe section 110 before encountering a shear-inducing plate 120 that reduces the diameter of the first pipe 110 by half without any tapering to reduce pressure. Sludge is physically degraded entering second pipe section 130. Sludge can exit the shear-inducing structure 100 and be substantially degraded. FIG. 1A presents a side perspective view while FIG. 1B depicts a front view.

In yet other embodiments, the flow interruption structure can be formed of non-circular shapes. In such embodiments, the area of the fluid opening to the area of the fluid output can be of the same ratios as the diameters previously listed for the circular embodiments (e.g., a ratio of about 1 to about 0.80 to a ratio of about 1 to about 0.20). Additional examples of non-circular shear inducing structures include plates with a series of concentric circle cutouts, slot cutouts, triangular cutouts, polynomial cutouts, a series of regular or irregular cutouts, and mesh cutouts in various embodiments. In certain embodiments, a circular opening shear inducing structure can also include additional protrusions in the fluid opening to increase shear forces.

The shear-inducing structure can be attached in any suitable manner. For example, the shear inducing structure can screw on to a pipe in some embodiments while in other embodiments, it can be affixed using a flange or welds.

Although the term atomization has been used herein, the output does not require dispersal into the air. In certain embodiments, the output from the shear inducing structure can be directed back into the sludge. As can be appreciated, this can be advantageous to further agitate the sludge and ensure that any fast-living chemical species such as peroxides immediately react with the sludge.

Generally, high-shear processes can be performed until the sludge is physically degraded to a free-flowing liquid having only extremely fine particles.

Chemical Oxidation

To further degrade sludge, a chemical oxidation treatment can be further performed. Chemical oxidation can further degrade the extremely fine particles remaining after high shear processes. Chemical oxidation can be performed using any known oxidizing chemical such as halogen oxyanion compounds (e.g., hypochlorite, chlorite, cholate, and perchlorate compounds), peroxides (e.g., hydrogen peroxide), ozone, nitric acid, nitrates, halogen gases and compounds (e.g., iodine, chlorine, bromine, and fluorine gases and compounds), and oxygen gases (e.g., oxygen gas and ozone). In certain embodiments, a combination of more than one oxidizing chemical can be used. Oxidizing compounds can oxidize solid waste contained within sludge to degrade the waste and produce clear water. For instance, oxidizing compounds can breakdown cellular membranes and EPS to allow for dissolution of volatile solids.

It has advantageously been discovered, however, that calcium hypochlorite, but not other similar hypochlorite compounds, can be particularly suitable for degradation of solid waste. Specifically, calcium hypochlorite has been discovered to quickly degrade sludge while leaving only residual calcium ions in the sludge. Calcium is safe, non-toxic, and less of an environmental concern than other ions or waste products. Additionally, calcium hypochlorite is easy to transport and disperse into sludge.

In some embodiments, the sludge may be agitated in order to increase exposure of the solid waste to the oxidizing chemical. Agitation may be accomplished using means known to those of skill in the art, including, but not limited to via an impeller aerator, a venturi pump, a vertical aerator and combinations thereof. The sludge may be agitated for a suitable length of time, e.g., up to about 24 hours during application of the oxidizing chemical. Insufficient agitation of the sludge can result in insufficient reaction of the oxidizing chemical to the sludge and insufficient or temporary degradation of the solid waste contained in the sludge.

Generally, chemical oxidation treatment can be performed until the sludge runs clear such as when the chlorine breakpoint and/or super saturation point is reached for chlorine-based oxidizing chemicals.

To degrade the sludge via chemical oxidation, the sludge may be treated with one or more doses of the oxidizing compound. For example, as described below, the process can begin with the addition of a first dose of an oxidizing compound to the sludge, and after a given time period, observing the sample to determine if the sludge has been broken down into smaller component parts.

Generally, the oxidizing chemical can be applied to the sludge in any suitable fashion. For example, the oxidizing chemical can be pumped, sprayed, or poured into the sludge. In certain embodiments, it can be particularly advantageous to use high velocity pumps on, for example, a lagoon crawler, to provide better mixing of the oxidizing chemical and the sludge.

In certain embodiments, one of skill in the art may measure or estimate its biochemical oxygen demand ("BOD") and/or chemical oxygen demand ("COD"). BOD and COD may be measured by one skilled in the art utilizing EPA standard methods. For example, BOD may be measured using EPA Standard Method 5210 B, i.e., the "5-Day BOD Test," which is incorporated herein by reference. BOD values may be expressed in milligrams of oxygen consumed per liter of sample ("mg/L") during 5 days of incubation at 20° C.

The first or "initial" BOD of sludge may vary depending upon the source of the sludge. For example, a slurry comprising human sanitary waste may have a first BOD of at least about 100 mg/L, at least about 200 mg/L, at least about 300 mg/L, at least about 400 mg/L, at least about 500 mg/L, at least about 1,000 mg/L, at least about 5,000 mg/L or at least about 10,000 mg/L. In a further example, a slurry comprising livestock sanitary waste may have a first BOD value that is substantially higher, e.g., at least about 2,000 mg/L, at least about 3,500 mg/L, at least about 5,000 mg/L or at least about 10,000 mg/L. In a further example, a slurry comprising sludge from a brewery may have a first BOD value that is at least about 2,400 mg/L, at least about 5,000 mg/L, at least about 9,000 mg/L or at least about 11,000 mg/L.

Depending upon the anticipated or measured BOD of the sludge to be treated, a first dose of oxidizing compound is added to the sludge. The first dose may be from about 100 ppm to 3,000 ppm, from about 300 to about 2,000 ppm, or from about 500 to about 1,500 ppm of an oxidizing compound. In some embodiments, the first dose may be sufficient to completely degrade the sludge. However, additional doses may be added as needed to degrade the sludge in certain embodiments.

In certain embodiments, the amount of oxidizing compound can be added until a super saturation point has been reached. A super saturation point ensures that the sludge degrades all of the solids without being depleted. For calcium hypochlorite, a super saturation point can be reached by adding between about 200 pounds per million gallons of wastewater to about 18,000 pounds, or more, per million gallons of wastewater. The exact amount of oxidizing compound can vary depending on the concentration of sludge, the type of wastewater, and any prior processing. For example, degradation using high-shear processing can reduce the amount of oxidizing compound required to reach a super saturation point.

In certain embodiments, it can be desirable to adjust or re-adjust the pH of the sludge at various stages of processing. For example, the pH can be adjusted before and/or after oxidizing treatment so that the sludge has a pH from about 6.5 to about 8.0, using methods known to those of skill in the art. In some embodiments, the pH of the sludge can be adjusted or re-adjusted to be about 6.5, about 7.0 or about 8.0.

A sample of the sludge be collected in order to measure for total chlorine (or other oxidizing compound) residuals in certain embodiments. The amount of total chlorine residuals may be expressed in ppm of chlorine. The total chlorine residuals may be measured using any method or means known to one of skill in the art. For example, total chlorine residuals may be measured using a color-wheel test kit, or a digital colorimeter. A digital colorimeter that is useful for measuring total chlorine residuals is the Hach Pocket Colorimeter II (Chlorine Free and Total) from the Hach Company (Loveland, CO); this colorimeter may be used to measure total chlorine residuals as follows. DPD tablets, powder or liquid (available from USA BlueBook (Waukegan, IL)) are added into a vial of sample water taken from the sludge. The sample is shaken to mix the DPD with the water, which will turn the water pink. The vial is inserted into the colorimeter, which reads the intensity of the color change by emitting a wavelength of light and automatically determining and displaying the color intensity digitally, which reflects the total chlorine residuals. The color measurement range of the colorimeter is from 0 to 4 mg/L, which is equivalent to 0 to 4 ppm of total chlorine residuals.

In certain embodiments, the sludge can be dechlorinated if excess oxidizing chemical was added. Generally, sludge can be dechlorinated using any suitable step that will at least partially, or totally, dissipate the total chlorine residuals from the chlorinated sludge. Suitable methods may be selected from the group of: adding a sulfur containing compound to the chlorinated sludge, exposing the chlorinated sludge to ultraviolet light (e.g., sunlight), aeration and combinations thereof.

In embodiments in which the sludge is dechlorinated by adding a sulfur containing compound, the sulfur containing compound may be selected from the following group of commercially available compounds: sodium bisulfate, potassium bisulfate, sulfur dioxide and combinations thereof. As a general rule of thumb, the chlorinated residual sludge may be dechlorinated by adding a sulfur containing compound in a molar ratio of about 1:1 with the chlorine containing compound that was previously added in the chlorination step to chlorinate the sludge.

Like in the chlorination/oxidation of the sludge, dechlorination of any residual sludge may be achieved by adding one or more doses of a sulfur containing compound to the chlorinated sludge. For example, as described below, dechlorinating the chlorinated sludge may begin with the addition of a first dose of a sulphur containing compound to the chlorinated sludge, and after a given time period, measuring a sample of the sludge for total chlorine residuals.

Once a first dose of sulfur containing compound is added to the residual sludge, it may be aerated a suitable length of time, e.g., up to about 24 hours. Without wishing to be bound by theory, it is believed that aeration of the residual sludge after a dose of sulfur containing compound is added thereto, drives dissipation of chlorine from the sludge. In some embodiments, aerating the residual sludge may be accomplished using: an impeller aerator, a venturi pump, a vertical aerator, forced air, diffused air, injected air and combinations thereof. A sample of the dechlorinated sludge is then collected in order to measure for total chlorine residuals.

If greater than 1.0 ppm, greater than 1.2 ppm or greater than 1.5 ppm of total chlorine residuals are present in the sample of water taken from the chlorinated sludge, then a second dose of a sulfur containing compound may be added to the sludge. The sludge may then be aerated for a suitable length of time, e.g., up to about another 24 hours, at which point the total chlorine residuals are again measured. This process may be repeated as needed until the total chlorine residuals are present in a concentration of less than about 1.0 ppm, less than about 0.8 ppm or less than about 0.5 ppm.

In certain embodiments, dichlorination can be performed by aeration alone. In such embodiments, aeration can be applied until all chemicals have been broken down (e.g., to about 1.0 ppm or less).

If no chlorine residuals remain in the residual sludge after the sludge is sufficiently degraded through chlorination, then dechlorination of the sludge may not be necessary.

Once the sludge contains little or no chlorine residuals, the sludge can be fully processed and ready for release. In other embodiments, additional processing can also be performed. For example, in certain embodiments, precipitation or flocculation agents can be added.

Suitable precipitation and flocculation agents can include iron salts or aluminum salts, which react with, flocculate and/or precipitate impurities in the sludge, such as phosphates. Exemplary "flocculating compositions" include the compositions described in U.S. Pat. No. 7,384,573B2, entitled, "Compositions for Wastewater Treatment," which is incorporated by reference in its entirety herein.

In some embodiments, the flocculating composition comprises a mixture of about 50-90% calcium carbonate ($CaCO_3$) and 10-50% magnesium carbonate ($MgCO_3$). Preferably, the composition comprises about 75% $CaCO_3$ and about 25% $MgCO_3$. In some embodiments, the flocculating composition of further comprises water, chitosan and acetic acid. For example, a composition comprising about 1-2 parts by weight chitosan, 1-2 parts by weight of a mixture of fine powders of $CaCO_3$ and $MgCO_3$ in a 3:1 ratio, 1-2 parts by weight of glacial acetic acid, and 100 parts by weight of water may be utilized.

In some embodiments, the flocculating composition comprises water, chitosan and acetic acid. An exemplary composition of may comprise about 1-2 parts by weight chitosan, 1-2 parts by weight of a mixture of fine powders of $CaCO_3$ and $MgCO_3$ in a 3:1 ratio, 1-2 parts by weight of glacial acetic acid, and 100 parts by weight of water.

In some embodiments, the flocculating composition comprises a lanthanum salt and a mixture of fine powders of $CaCO_3$ and $MgCO_3$, which preferably is in a 3:1 ratio. Preferably, the lanthanum salt is lanthanum chloride. In a specific embodiment, the composition comprises about 36% to about 60% by weight of lanthanum chloride, and about 7% by weight of a composition comprising a mixture of fine powders of $CaCO_3$ and $MgCO_3$ at a ratio of about 3:1. Certain flocculating compositions can further include cerium.

In a typical sludge treatment operation, about 2-30 ppm (parts per million of wastewater to be treated) of one of the aforementioned compositions of the are applied to the sludge to achieve acceptable treatment conditions, which include a neutralized pH. Without wishing to be bound by theory, it is believed that the flocculant, is catalyzed by rare earth and/or chitosan blends, which causes flocculation in the water, drawing insoluble material out of insolubility to soluble state, and in turn, buffers the solution toward a neutral pH.

Biological Treatment

In certain embodiments, a biological treatment can be used to further degrade any remaining residual sludge in the processed sludge to produce clean water. Although beneficial, biological treatment is not necessary for many applications.

If a biological step is performed, the sludge can be inoculated with bacteria selected from the group of aerobic bacteria, facultative bacteria and combinations thereof. Without wishing to be bound by theory, it is believed that the bacteria biodegrade any remaining residual sludge (i.e., "residual waste"), breaking it down to the molecular level, in some embodiments resulting in clear water. For example, the bacteria may digest the sludge such that remaining water contains a reduced solids content by weight of the original solids content, wherein the reduction is at least about 25%, at least about 50%, at least about 75%. In some embodiments, the reduction is from about 25% to about 100%, from about 30% to about 90%, from about 50% to about 75%. In some embodiments, the reduction in sludge is from about 95% to about 100%.

It is further believed that the bacteria utilize any remaining solids as sources of energy, metabolizing components of the degraded solids and converting them into gasses, which may be released into the atmosphere. This is particularly advantageous when treating sludge that contains manure.

For example, untreated manure releases methane. It is believed that in the regeneration step, the added bacteria digest methane, releasing a hydrogen atom to bind with oxygen to produce water and to produce hydrogen gas that rises to the surface of the water and dissipates.

Untreated manure also releases hydrogen sulfide, which is a colorless gas with the characteristic foul odor of rotten eggs. Hydrogen sulfide is poisonous, corrosive and flammable, and has been responsible for the deaths of numerous dairy farmers and cattle around manure pits. It is believed that in the regeneration step, the bacteria break the hydrogen bond from sulfur, resulting in elemental sulfur, allowing the hydrogen to bond with oxygen, producing water, as well as "off-gassing" the hydrogen in the form of gas bubbles that rise to the surface of the water.

Thus, the present method may produce water and off-gas harmful constituents of the solid matter. Advantageously, this may eliminate the need to remove sludge to another location for disposal and/or the need to incinerate the sludge on site. Moreover, the present method may eliminate the need to have multiple biological receptacles (e.g., multiple lagoons on a farm) since the sludge may be eliminated and more sludge to be treated subsequently added thereto.

Any suitable source of bacteria may be utilized to inoculate the sludge. In some embodiments, the bacteria may be sourced from commercially available bioaugmentation products such as Formula D-500 and Bacteria Supplement D500A for Municipal WWTP, each from USA BlueBook (Waukegan, IL).

Like in the stabilization of the sludge, inoculation of the sludge may be achieved by adding one or more doses of bacteria to the dechlorinated sludge. For example, inoculating the sludge may begin with the addition of a first dose of bacteria. If commercially available bioaugmentation products are utilized, the first dose may be determined based upon the supplier's instructions. In any case, it may not be necessary to limit the amount of bacteria utilized to inoculate the sludge. As little as about 1 ppm of the bacteria may be added to the sludge. Any additional bacteria added beyond 1 ppm may enhance the feed-rate of the bacteria, driving the efficiency of the digestion of any residual sludge.

In certain embodiments, treatment of sludge can occur for an entire body of water at once (e.g., an entire lagoon or wastewater container) while in other embodiments, the process can be performed in sections. If treatment is performed in sections, the entire body of water can be mixed together to ensure homogeneity.

In certain embodiments, a body of wastewater can be treated with only high-shear processes and optionally agitation. Such processes have been found to be highly effective even absent chemical and biological treatments.

EXAMPLES

Example 1

Figure 2:
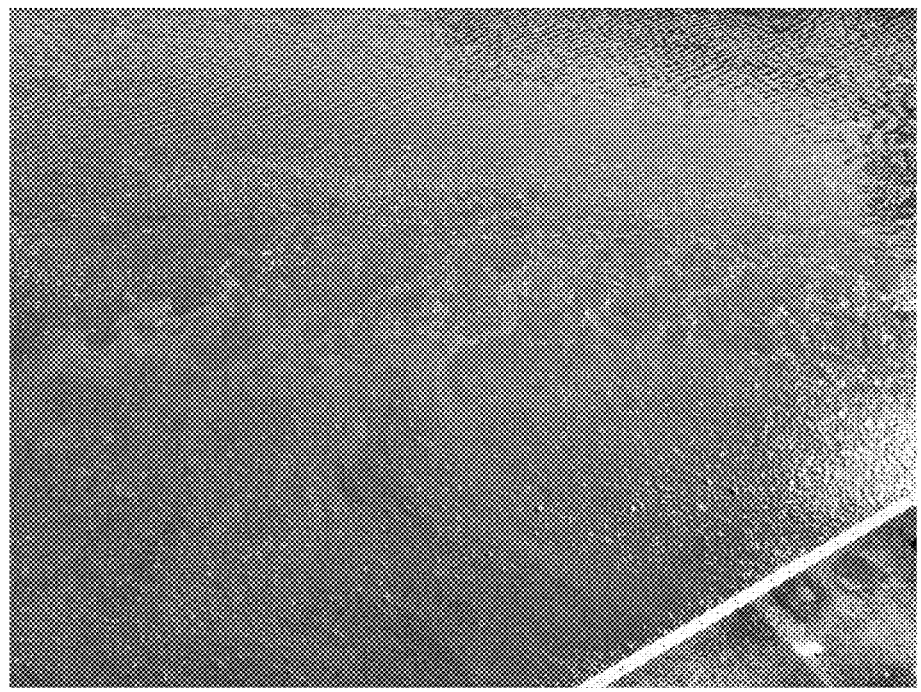
FIG. 2 depicts a photograph of a wastewater lagoon in Boston, GA containing mud (sludge) and biological growth.

A wastewater lagoon in Boston, GA is treated using the methods described herein. A picture of the wastewater lagoon before treatment is depicted in FIG. 2. As depicted, the wastewater lagoon is overrun with bio-sludge and other biological growth at least 5 feet deep.

Figure 3:
FIGS. 3 and 4 depict photographs of the wastewater lagoon of Example 1 being degraded using a high-shear process.
Figure 4:

The wastewater lagoon is treated using agitation and high-shear processing to degrade the sludge contained in the lagoon. Although mostly directed underwater, FIG. 3 depicts a picture of the sludge being atomized by a shear-inducing structure attached to the lagoon crawler. FIG. 4 depicts a further picture of high-shear processing showing the formation of foam on the surface of the lagoon as the sludge is degraded.

After degradation with the high-shear processing, a biological treatment was performed by adding one gallon of Magnum Microbial (Magnum D.O. Aerators) per million gallons of slurry. The slurry is mixed 24 hours. Addition of the bacteria is depicted in FIG. 5.

Figure 5:
FIG. 5 depicts a photograph the addition of bacteria into the wastewater lagoon of Example 1.
Figure 6:
FIG. 6 depicts a photographic comparison of the wastewater lagoon of Example 1 before and after treatment using the high-shear and biological processes described herein.

FIG. 5 shows a comparison of the lagoon before treatment and 5 weeks after treatment. As can be seen in FIG. 6, the lagoon has retained its clear water quality.

Example 2

Figure 7:
FIG. 7 depicts a photograph of the wastewater collection facility of Example 2 showing unprocessed sludge.

A wastewater collection facility impacted with solid waste is treated to produce free flowing water. The sludge contained in the wastewater collection facility is depicted in FIG. 7. As depicted, the sludge is overrun with solid waste.

Figure 8:
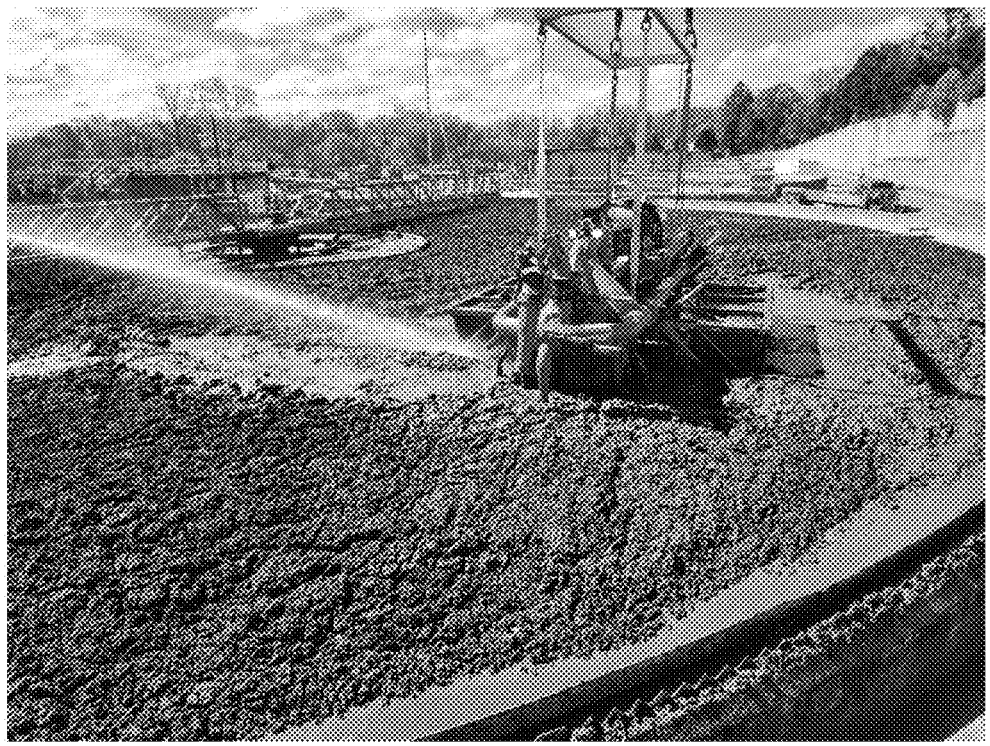
FIG. 8 shows pre-treatment and agitation of the sludge of Example 2 to form a slurry.
Figure 9:
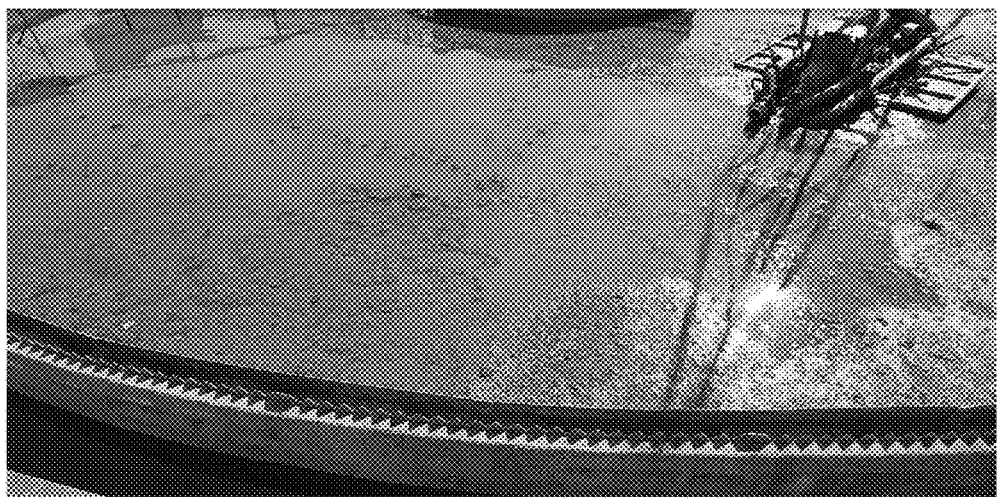
FIGS. 9 and 10 each depict photographs of the sludge of Example 2 being degraded using a high-shear process.
Figure 10:
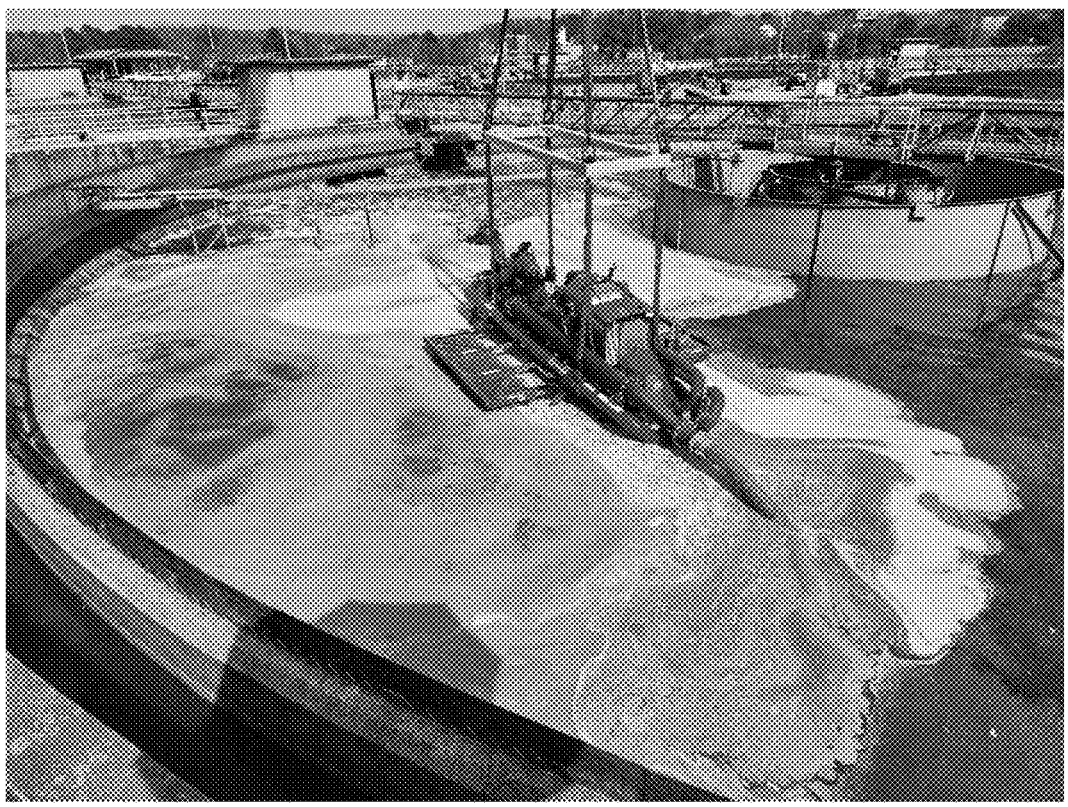
Figure 11:
FIG. 11 depicts a photograph of the shear-inducing structure degrading sludge.
Figure 12:
FIG. 12 depicts a photograph of the shear-inducing structure.

To begin treatment, the sludge contained within the sewer wastewater collection facility is processed by using a Nuhn-crawler to produce a flowable sludge as depicted in FIG. 8. Following initial agitation, a high-shear process is used to degrade the solid waste. FIGS. 9 and 10 depict photographs showing the high-shear process producing a fine silt of degraded solid waste and a lighter colored residue on the surface of the sludge. FIG. 11 depicts a photograph of the shear inducing structure outputting an atomized stream of degraded sludge. FIG. 12 depicts a photograph of the shear inducing structure at rest.

Figure 13:
FIG. 13 depicts addition of calcium hypochlorite to the sludge of Example 2.
Figure 14:
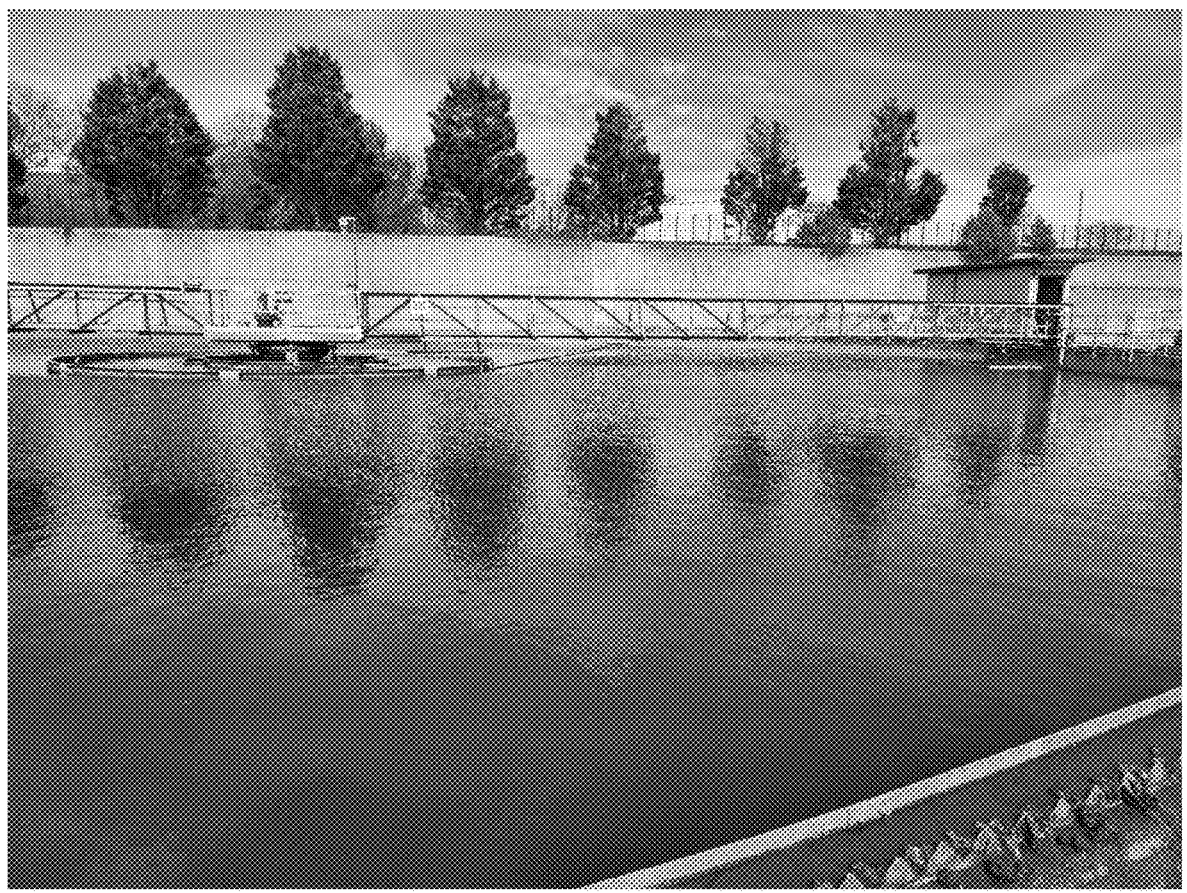
FIG. 14 depicts a photograph of the fully processed wastewater of Example 2.

Following the high-shear process, calcium hypochlorite is added to further degrade the sludge until a super saturation point is reached. The calcium hypochlorite is added by pumping using the lagoon crawler as depicted in FIG. 13. FIG. 14 depicts a photograph of the fully processed wastewater showing that the water is now clean and free flowing.

Example 3

To verify degradation of sludge from the high-shear processes, the output of a high-shear process during processing of a manure filled lagoon was sampled. The samples were evaluated for the presence of peroxides using peroxide test strips (Hydrogen Peroxide Test Strips, Low Level, 0-100 ppm, marketed by Bartovation (West Harrison, NY)). The peroxide test strips indicated that at least 100 ppm of peroxides were present in the sludge degraded by the hear-shear processing described herein.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

It should be understood that certain aspects, features, structures, or characteristics of the various embodiments can be interchanged in whole or in part. Reference to certain embodiments mean that a particular aspect, feature, structure, or characteristic described in connection with certain embodiments can be included in at least one embodiment and may be interchanged with certain other embodiments. The appearances of the phrase "in certain embodiments" in various places in specification are not necessarily all referring to the same embodiment, nor are certain embodiments necessarily mutually exclusive of other certain embodiments. It should also be understood that the steps of the methods set forth herein are not necessarily required to be performed in the orders described, and the order of the steps of such methods should be understood to be merely exemplary. Likewise, additional steps can be included in such methods, and certain steps may be omitted or combined, in methods consistent with certain embodiments.

What is claimed is:

1. A sludge treatment method comprising the steps of:
   a) degrading the sludge to form a degraded sludge using high shear processing, wherein the high shear processing comprises the steps of attaching a removable shear inducing structure to an output of a pump external to the removable shear inducing structure, and pumping the sludge through the shear inducing structure to reduce the mass of solid waste within the sludge by about 35% or more through physical and chemical degradation of the sludge from shear forces generated by the removable shear inducing structure; and
   b) optionally adding to the degraded sludge one or more of a chemical oxidant to chemically oxidize solids in the degraded sludge; and aerobic bacteria, facultative bacteria and combinations thereof to biologically metabolize solids in the degraded sludge; and
   wherein the removable shear inducing structure comprises a fluid opening, a planar flow interruption structure, and a fluid output; and
   wherein the planar flow interruption structure comprises a planar obstruction to the fluid opening and forms the fluid output.

2. The method of claim 1 comprising the step of adding the chemical oxidant.

3. The method of claim 1, wherein the high shear processing produces a concentration of hydrogen peroxide of about 100 ppm or greater.

4. The method of claim 1, wherein the planar flow interruption structure reduces the fluid opening.

5. The method of claim 1, wherein planar the flow interruption structure is a substantially circular opening in a plate.

6. The method of claim 1, wherein the area ratio of the fluid opening to the fluid output is a ratio of about 1:0.8 to about 1:0.10.

7. The method of claim 1, wherein the high shear processing reduces the mass of the solid waste by about 35% or more.

8. The method of claim 2, wherein the chemical oxidant comprises calcium hypochlorite.

9. The method of claim 2, wherein the step of adding the chemical oxidant comprises the addition of the chemical oxidant at a concentration of about 100 parts per million to about 3,000 parts per million.

10. The method of claim 2, further comprising the step of dechlorinating the degraded sludge after the step of adding the chemical oxidant.

11. The method of claim 1, wherein the sludge is municipal waste, farm waste, or industrial waste.

12. The method of claim 1, wherein the pump external to the removable shear inducing structure is a floating pump.

13. The method of claim 1, wherein the pump external to the removable shear inducing structure is a fixed pump.

14. The method of claim 1 comprising the step of adding the aerobic bacteria, facultative bacteria and combinations thereof.

15. The method of claim 1, wherein the removable shear inducing structure does not comprise moving parts.

16. The method of claim 1, wherein the area ratio of the fluid opening to the fluid output is a ratio of about 1:0.5.

17. The method of claim 1, further comprising the step of aerating the sludge with one or more of an impeller aerator, a venturi pump, a vertical aerator, forced air, diffused air, injected air and combinations thereof.

* * * * *